US009277500B1

(12) United States Patent
Solsona-Palomar et al.

(10) Patent No.: US 9,277,500 B1
(45) Date of Patent: Mar. 1, 2016

(54) POWER EFFICIENT WIRELESS CONNECTIVITY

(75) Inventors: Marc Solsona-Palomar, Bellevue, WA (US); Vlad Troyanker, San Jose, CA (US); Jalaja C. Kurubarahalli, Milpitas, CA (US); Adrian D. Caceres, Los Gatos, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 349 days.

(21) Appl. No.: 13/608,910

(22) Filed: Sep. 10, 2012

(51) Int. Cl.
*G08C 17/00* (2006.01)
*H04W 52/02* (2009.01)

(52) U.S. Cl.
CPC .................. *H04W 52/0229* (2013.01)

(58) Field of Classification Search
CPC ............ H04W 52/0229; H04W 52/0206; H04W 84/12; H04W 52/0216
USPC ........................................... 370/311
See application file for complete search history.

(56) References Cited

U.S. PATENT DOCUMENTS

| | | | | |
|---|---|---|---|---|
| 7,119,676 | B1 * | 10/2006 | Silverstrim | G01D 21/00 340/506 |
| 2007/0004436 | A1 * | 1/2007 | Stirbu | H04W 12/02 455/503 |
| 2007/0242695 | A1 * | 10/2007 | Xu | H04W 48/08 370/468 |
| 2008/0140767 | A1 * | 6/2008 | Rao | H04L 67/00 709/203 |
| 2008/0285495 | A1 * | 11/2008 | Wentink | H04W 12/02 370/311 |
| 2009/0109887 | A1 * | 4/2009 | Chandra et al. | 370/311 |
| 2009/0249222 | A1 * | 10/2009 | Schmidt | H04N 21/2368 715/751 |
| 2010/0048208 | A9 * | 2/2010 | Gunaratnam et al. | 455/435.2 |
| 2010/0329163 | A1 * | 12/2010 | Aoki | H04W 52/0251 370/311 |
| 2012/0026992 | A1 * | 2/2012 | Navda et al. | 370/338 |
| 2012/0163264 | A1 * | 6/2012 | Chu | H04L 61/6022 370/311 |
| 2013/0183982 | A1 * | 7/2013 | Martin et al. | 455/437 |
| 2013/0326250 | A1 * | 12/2013 | Sullivan et al. | 713/323 |

* cited by examiner

*Primary Examiner* — Khaled Kassim
*Assistant Examiner* — Syed S Ali
(74) *Attorney, Agent, or Firm* — Sutherland Asbill & Brennan LLP (57) ABSTRACT

Described herein are systems and methods for reducing power consumption in a device while maintaining a wireless local area network connection. An interface processor of a wireless interface is configured to maintain a network connection while an application processor is in a low power mode. The interface processor may awaken the application processor to a high power mode upon receipt of a wakeup signal, loss of network connection, detection of a network suitable for connection, or other pre-determined event.

12 Claims, 11 Drawing Sheets

POWER EFFICIENT WIRELESS CONNECTIVITY

BACKGROUND

User devices with wireless interfaces configured to connect to a wireless network may have limited power or other resources for operation. The wireless network may be used to transfer a wide variety of data including content for consumption, administrative data, or control data.

DETAILED DESCRIPTION

A wide variety of user devices ranging from appliances to consumer electronics utilize wireless networks to exchange information. For example a user device may use a wireless network to connect to the internet to exchange information with a server. For ease of discussion, in this disclosure "server" indicates a server or other resource external to the user device.

The user device includes one or more primary or application processors configured to execute an operating system, applications, and so forth. The application processor is configured to transition between a high power mode and a low power mode. The high power mode consumes more electrical power than the low power mode. The low power mode may also be known as a sleep or suspend mode.

The user device also includes a wireless interface with an interface processor and a transceiver. The interface processor may consume less electrical power than the application processor. The interface processor may also be configured to transition between a high power mode and a low power mode. The transceiver is configured to establish a network connection with another transceiver, such as in an access point. Using this network connection the user device may exchange data with the server. Various networking devices may process the data during transit between the user device and the server. The networking devices may include routers, firewalls, network address translators, and so forth.

The networking devices may be configured to block inbound traffic unless the user device has previously opened a connection. Inbound traffic is data originating at a location outside of the local network to which the user device has a wireless local area network connection. Blocking improves network security for the user device but prevents legitimate resources such as the server from communicating directly with the user device using the network. For example, when the server has data to send to the user device, the networking devices may block this message.

As described herein, the user device may be configured to send keepalive data to the server. Ongoing transmission of the keepalive data across the network maintains a network connection between the user device and the server through the networking devices. Because the keepalive reoccurs, a pathway is maintained allowing the server to communicate as needed with the user device.

To reduce power consumption, the interface processor may be configured by the application processor to transmit the keepalive data while the application processor is in the low power mode. The ongoing transmission of the keepalive data maintains the connectivity and inbound path so the server is able to communicate with the user device.

The interface processor may also be configured to receive wakeup data sent by the server. The wakeup data triggers the interface processor to wakeup or transition the application processor from the low power mode to a high power mode. Once in the high power mode, the application processor may communicate with the server or take other action.

The interface processor may also be configured to scan for networks and perform other actions while the application processor is in the low power mode. By reducing the amount of time the application processor is in high power mode, power consumption is reduced. This reduction in power consumption may extend the operating time available to the user device.

Illustrative System

Figure 1:
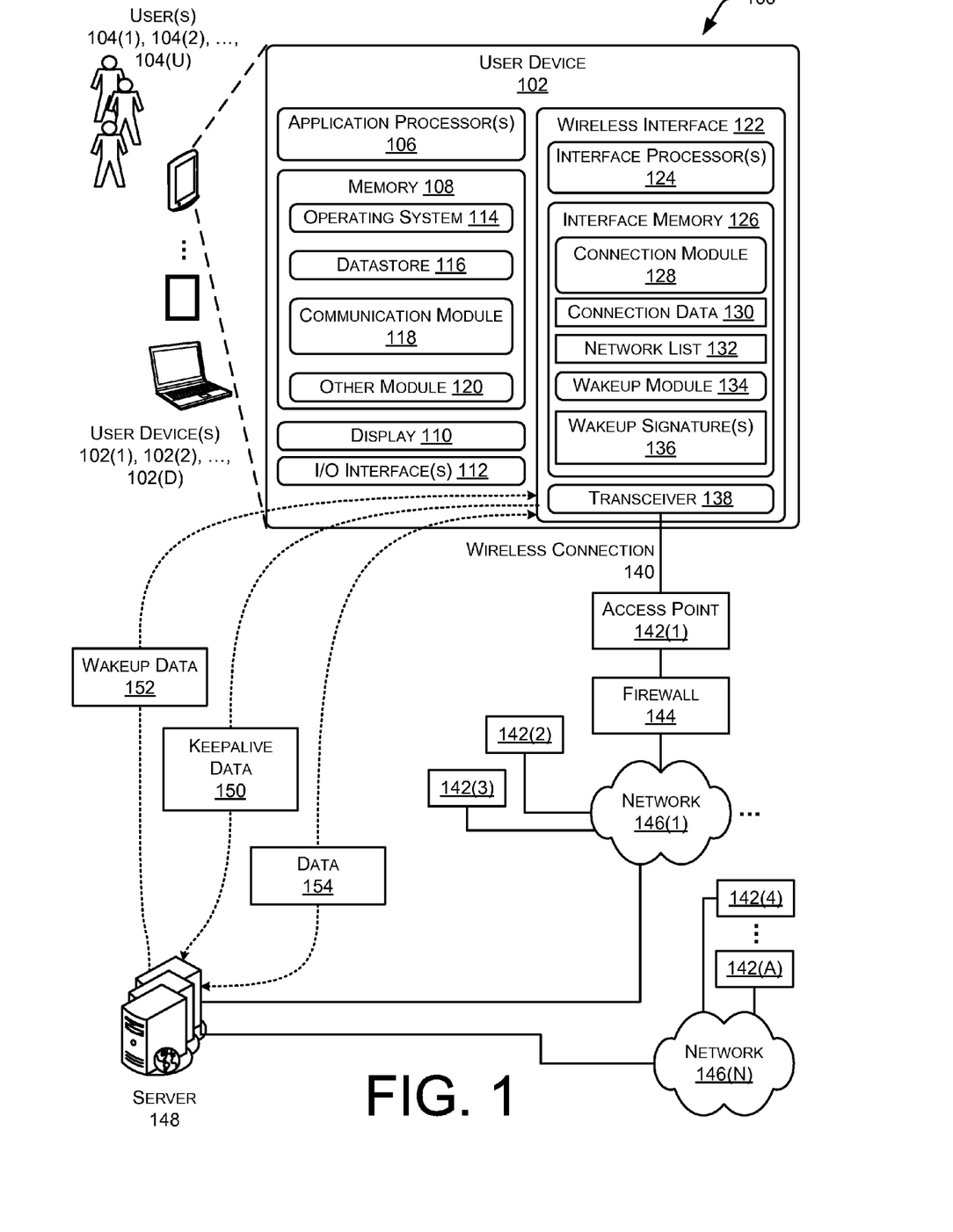
FIG. 1 illustrates a system for implementing a power efficient wireless connectivity.

FIG. 1 illustrates a system 100 implementing a power efficient wireless connectivity. One or more user devices 102(1), 102(2), . . . 102(D) may be used by one or more users 104(1), 104(2), . . . , 104(U). As used herein, letters enclosed by parenthesis such as "(D)" indicate an integer having a value greater than zero. The user devices 102 may include e-Book reader devices, laptops, desktops, tablet computers, televisions, set-top boxes, game consoles, and so forth. The techniques described herein may also be used with other devices, such as embedded devices. The user devices 102 are described in more detail below.

The user device 102 may comprise one or more application processors 106, one or more memories 108, one or more displays 110, one or more input/output ("I/O") interfaces 112, and one or more network interfaces 114. The user device 102 may include other devices not depicted, such as global positioning system receivers, cameras, keyboards, and so forth.

The application processor 106 may comprise one or more cores and is configured to access and execute at least in part instructions stored in the one or more memories 108. The application processor 106 may be configured to execute instructions associated with several different applications and interact with different components in the user device 102. In some implementations, the application processor 106 may also be known as a central processing unit or main processor.

The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The one or more displays 110 are configured to present visual information to the user 104. The display 110 may comprise an emissive or reflective display configured to present images. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The one or more displays 110 may be configured to present images in monochrome, color, or both. In some implementations, the one or more displays 110 of the user device 102 may use emissive, reflective, or combination displays with emissive and reflective elements.

The one or more I/O interfaces 112 may also be provided in the user device 102. These I/O interfaces 112 allow for coupling devices such as keyboards, joysticks, touch sensors, cameras, microphones, speakers, haptic output devices, external memories, and so forth to the user device 102. The devices coupled to the I/O interfaces 112 may be configured to generate notifications, such as when data is received from a touch sensor.

The one or more memories 108 may store instructions for execution by the application processor 106 to perform certain actions or functions. These instructions may include an operating system module 114 configured to manage hardware resources such as the I/O interfaces 112 and provide various services to applications or modules executing on the application processor 106. The one or more memories 108 may also store a datastore 116, a communication module 118, and one or more other modules 120. While described as individual modules herein, it is understood that the functions and operations of various modules may be merged, distributed, and so forth. These modules may be executed while the application processor 106 is in a high power mode. During a low power mode of the application processor 106, execution may be suspended.

The datastore 116 is configured to store information such as configuration files, user information, connection data, network lists, wakeup signatures, and so forth. This information may be stored in a database, linked list, tree, or other data structure.

The communication module 118 is configured to establish and maintain wireless connections using a wireless interface 122. The communication module 118 may be configured to communicate using transmission control protocol/internet protocol ("TCP/IP"). The communication module 118 is discussed below in more detail with regard to the wireless interface 118.

The other module 120 may provide a variety of functionality, including email clients, mapping applications, encryption applications, and so forth. The other module(s) 120 may be configured to communicate using services provided by the communication module 118 and the wireless interface 122.

The wireless interface 122 provides for the transfer of data between the user device 102 and another device such an access point, another user device 102, and so forth. The wireless interface 122 may be configured to provide communication with, networks including but not limited to personal area networks ("PANs"), wired local area networks ("LANs"), wireless local area networks ("WLANs"), wireless wide area networks ("WWANs"), and so forth. The wireless interface 122 may utilize acoustic, radio frequency, optical, or other signals to exchange data between the user device 102 and another device such as an access point, a host computer, a server, another user device 102, and the like.

The wireless interface 122 comprises one or more interface processors 124. The interface processor 124 operates the functions of the wireless interface 122. The interface processor 124 may be configured to exchange data with the application processor 106. In contrast to the general functionality of the application processor 106, the interface processor 124 is dedicated to managing the functions of the wireless interface 122 and executing instructions associated with the operation of the wireless interface 122. Additionally, the interface processor 124 may have limited processing capability compared to the application processor 106. For example and not by way of limitation, the interface processor 124 may comprise across all cores about 15,000 transistors while the application processor 106 may have more than 20,000 transistors across all cores.

The interface processor 124, as well as other components in the wireless interface 122 may be configured to transition between a high power mode and a low power mode to reduce power consumption, mitigate thermal effects, and so forth. The interface processor 124 may consume less power than the application processor 106. In some implementations the interface processor 124 may comprise a microcontroller, application specific integrated circuit ("ASIC"), field programmable gate array ("FPGA") and so forth.

The wireless interface 122 includes an interface memory 126 comprising one or more CRSM. A connection module 128 may be stored in the interface memory 126. The connection module 128 is configured to transmit keepalive data, monitor connection status, scan for wireless networks, and so forth. The connection module 128 may be configured to handle address resolution protocol ("ARP") requests and other TCP/IP related functions when the communication module 118 is inaccessible due to the application processor 106 being in the low power mode.

The connection module 128 may access connection data 130 received from the communication module 118 and stored in the interface memory 126. The connection data 128 provides information about an established connection to be maintained. The connection data 128 may be provided to the connection module 128 using an application programming interface ("API"). The connection data 128 is discussed below in more detail with regard to FIG. 2.

The connection module 128 may also access a network list 132 received from the communication module 118 and stored in the interface memory 126. The network list 132 comprises data describing one or more wireless networks which the user device 102 may connect with. The network list 132 may be generated by the user 104 accepting to connect with a particular wireless network, received from another device such as a server, and so forth. The network list 132 is discussed below in more detail with regard to FIG. 3.

A wakeup module 134 is configured to process data received from the wireless network using a wakeup signature 136 to determine what received data will trigger a wakeup. For example, the wakeup signature 136 may define a particular piece of data such as a string which, when received and processed by the interface processor 124, results in the interface processor 124 generating a signal configured to wake up the application processor 106.

One or more of the wakeup signatures 136 may be received from the communication module 118 and stored in the interface memory 126. When data received matches one of the wakeup signatures 136, the wakeup module 134 is configured to generate a wakeup signal configured to transition the application processor 106 from the low power state to the high power state. In some implementations the wakeup signal may comprise an interrupt sent along a general purpose input/output connection. In some implementations the interrupt may comprise data, such as a packet of data sent along one or more data lines. For example, the interrupt may comprise a software interrupt which announces a particular state or calls for action. In other implementations, the interrupt may comprise applying a voltage to, removing a voltage from, or modulating a voltage on a pin or bus line coupled to the application processor 106, or an associated device such as a power management integrated circuit ("PMIC"), interrupt handler processor, and so forth. For example, the interrupt may comprise a hardware interrupt responsive to an interrupt request, such as generated by the interface processor 124 on behalf of the wakeup module 134.

The wakeup module 134 may also determine an application associated with the wakeup data and pass at least a portion of the wakeup data to the application after the application processor 106 has resumed high power mode operation. The wakeup signatures 136 are discussed below with regard to FIG. 4.

The wireless interface 122 comprises a transceiver 138 configured to exchange data wirelessly with another device such as an access point, another user device 102, and so forth. The transceiver 138 may be configured to send and receive data using radio frequencies, optical wavelengths, magnetic fields, sound, and so forth. In one implementation the transceiver 138 may comprise a radio transceiver configured to operate on one or more standard networking protocols. These networking protocols include, but not limited to the 802.11 standards promulgated by the Institute of Electrical and Electronics Engineers ("IEEE"). In some implementations, the wireless interface 122 may comprise a plurality of transceivers.

The transceiver 138 is configured to establish a wireless connection with one or more other transceivers, such as in an access point 142. The access point 142 may be communicatively coupled to another device such as a firewall 144 or other network device. The firewall 144 or other network device in turn communicatively couples to a network 146. The network 146 may comprise a private network, public network such as the Internet, or a combination thereof. The network 146 in turn couples to a server 148.

In some implementations a plurality of access points 142(1), 142(2), . . . , 142(A) may be present which in turn may couple to one or more networks 146(1), 146(2), . . . , 146(N).

The server 148 may comprise one or more computing devices configured to send, receive, or send and receive data with the user device 102. As described above, the connection module 128 of the wireless interface 122 may be configured to send keepalive data 150. Transit of the keepalive data 150 across the network 146 maintains a network connection with which the server 148 may communicate with the user device 102, even through intervening network devices such as the firewall 144.

This keepalive data 150 may comprise one or more user datagram protocol ("UDP") packet. The keepalive data 150 may be static, or may be configured to convey additional information about the user device 102. For example, the keepalive data 150 may include last known geographic position, battery status, and so forth.

The server 148 may send wakeup data 152 along the network connection established and kept open by transit of the keepalive data 150. The wakeup data 152 may comprise information corresponding to the wakeup signature 136. When received, the wakeup module 134 parses the wakeup data 152 and may transition the application processor 108 from the low power mode to the high power mode.

Data 154 may be exchanged between the user device 102 and the server 148. The data 154 may be described as being inbound data when received by the user device 102 or outbound data when sent by the user device 102. This data 154 may include content for consumption, programs. Email, and so forth. With the ongoing transmission of the keepalive data 150 from the connection module 128 maintaining a network connection between the user device 102 and the server 148, the wakeup data 152 to awaken the application processor 106, and so forth, the data 154 may be transferred more quickly and with reduced power consumption.

While some modules and data are depicted as stored in the interface memory 126, in some implementations the wireless interface 122 and the application processor 106 may share a common memory. This common memory is configured to remain accessible when the application processor 106 or the wireless interface 122 is in a low power mode.

Figure 2:
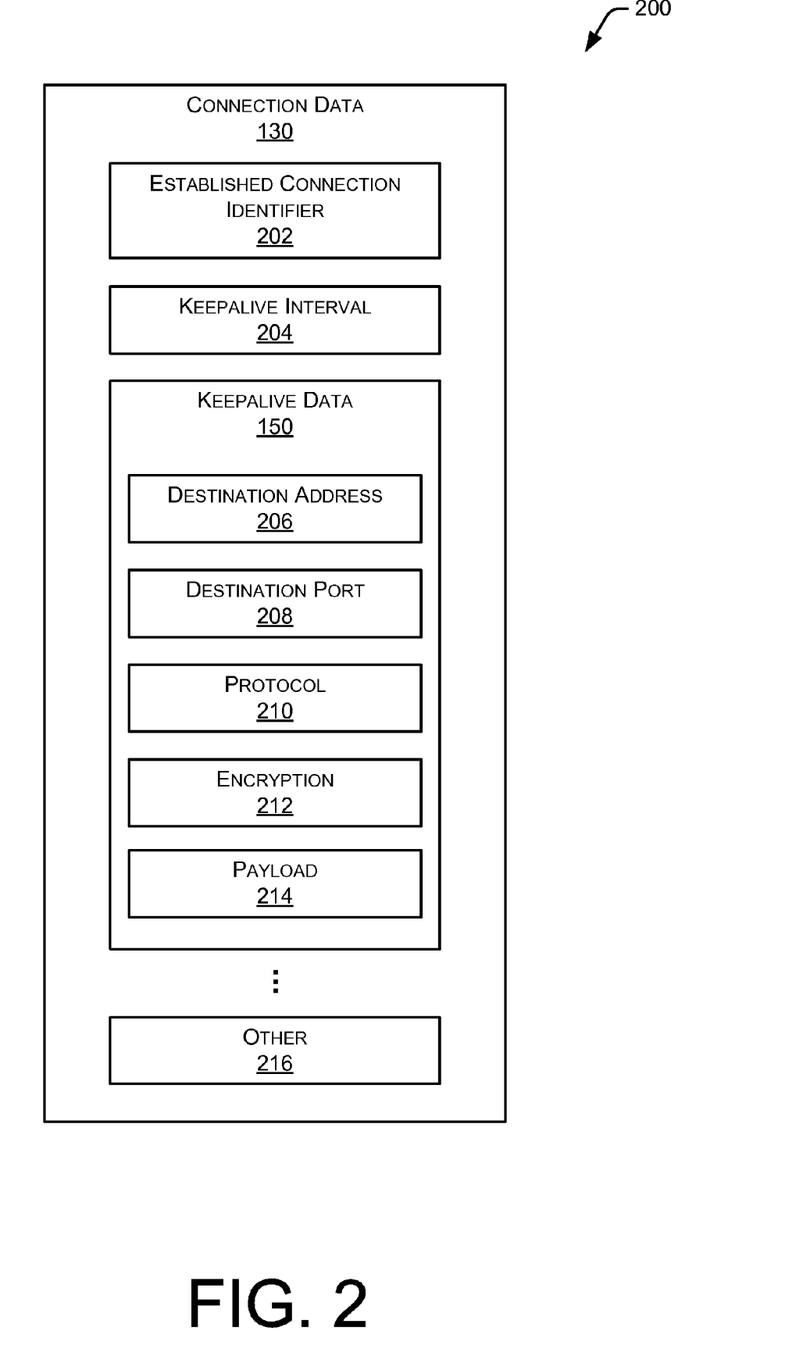
FIG. 2 illustrates a block diagram of connection data which may be sent from an application processor to a wireless interface processor.

FIG. 2 illustrates a block diagram 200 of the connection data 130. As described above, the communication module 118 may execute on the application processor 106. The communication module 118 may configure the wireless interface 122 to perform one or more functions while the application processor 106 is in the low power mode. One of the functions is maintaining an established network connection. For example, the user device 102 may be connected to the wireless network "Pine" which provides connectivity to the server 148.

The connection data 130 provides information to the connection module 128 in the wireless interface 122 for use in maintaining an established network connection. In some implementations, the connection data 130 may be provided to the connection module 128 using an application programming interface ("API") provided by the operating system 114 or the communication module 118.

The connection data 130 may comprise an established connection identifier 202 which identifies a particular connection, such as "Pine137." A keepalive interval 204 defines an interval of time between transmission of the keepalive data 150 across the network 146. For example, the keepalive interval 150 may be about 27 seconds. The keepalive interval 150 may be fixed or dynamically vary. The keepalive interval 150 may also vary based on the established connection identifier 202 or other factors. For example, the keepalive interval 150 for the "Pine137" network connection may be 27 seconds while the "Oak393" network connection is set to about 13 seconds. In some implementations the connection module 128, the communication module 118, or both may be configured to test different intervals on a particular network to determine a keepalive interval 150 in which bidirectional communication with the server 148 is maintained but which minimizes transmissions.

The connection data 130 may also comprise keepalive data 150. This may include one or more of a destination address 206, destination port 208, or protocol 210. The destination address 206 may specify an address of the server 148 on the network 146. For example, an IP address. The destination port 208 may specify a TCP or UDP port. A protocol 210 may be specified, such as whether the keepalive data 150 is to be sent as a UDP or a TCP packet.

The keepalive data 150 may also be encrypted in some implementations. The connection data 130 may include encryption 212 information such as keys, initialization vectors, and so forth. The keepalive data 150 may include payload 214. For example, current battery state, last known geographic location, and so forth may be included in the keepalive data 150.

Other data 216 may also be included in the connection data 130. For example, the established connection may have an expiration time such that after a given interval or particular count of transmitted keepalive data 150, keepalives will be discontinued.

Figure 3:
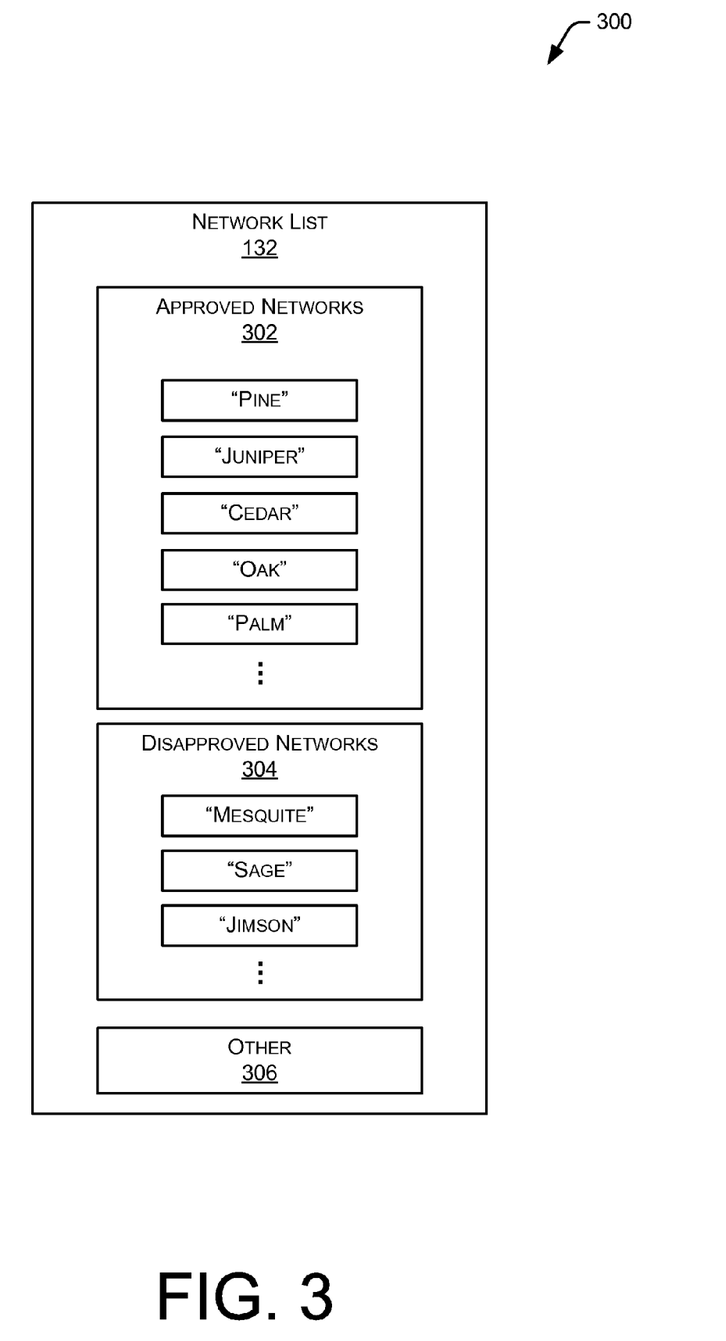
FIG. 3 illustrates a block diagram of a network list which may be sent from an application processor to a wireless interface processor.

FIG. 3 illustrates a block diagram 300 of the network list 132. The network list 132 may be provided by the communication module 118 to the connection module 128. The network list 132 may be sent from an application processor to a wireless interface processor. The network list 132 comprises data describing one or more wireless networks which the user device 102 may connect with. The network list 132 may comprise one or more approved networks 302. These are wireless networks which are approved or authorized for use in establishing a network connection. For example, these may be wireless networks for which the user 102 has accepted particular terms of service. In this example, the network list 132 includes the approved networks 302 identified with the names "Pine", "Juniper", "Cedar", "Oak", and "Palm". The approved networks 302 data may also include connection details such as security credentials, login information, encryption details, and so forth.

In some implementations, a list of disapproved networks 304 may be provided. These are wireless networks which are known but disallowed for connection. For example, these may be wireless networks which incur unacceptable costs, have insufficient security measures, and so forth. For example, the disapproved networks 304 in this illustration are identified with the names "Mesquite", "Sage", and "Jimson".

The network list 132 may also include other 306 data. For example, the other data 306 may include dates/times which one or more of the approved networks 302 are valid for. For example, the "Juniper" network may be available for use for the next 24 hours, but after that may be unavailable.

Figure 4:
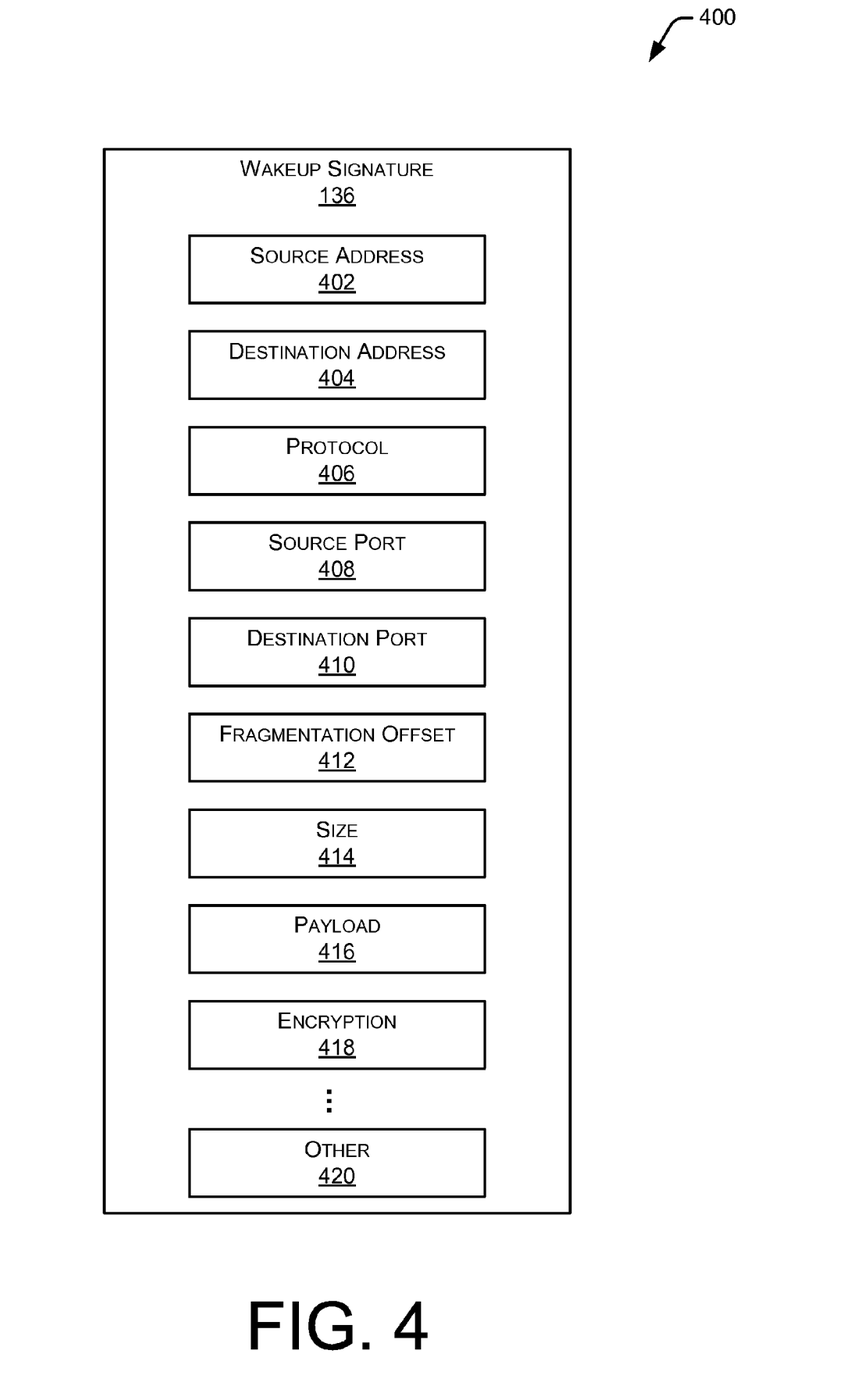
FIG. 4 illustrates a block diagram of a wakeup signature which may be sent from an application processor to a wireless interface processor.

FIG. 4 illustrates a block diagram 400 of the wakeup signature 136. One or more wakeup signatures 136 may be provided by the communication module 118 to the wireless interface 122 for access by the wakeup module 134. The wakeup module 134 may be configured to compare data such as the wakeup data 152 received by the transceiver 138 with the one or more wakeup signatures 136. When the comparison indicates a match, the wakeup module 134 may generate a signal to transition the application processor 106 from the low power mode to the high power mode. The wakeup signature 136 may thus be used to reduce or eliminate erroneous wakeups by the wakeup module 134. The wakeup module 134 may use the wakeup signatures 136 to define what received data will trigger a wakeup, or will not trigger a wakeup.

The wakeup signature 136 and the corresponding wakeup data 152 may comprise one or more of a source address 402, destination address 404, protocol 406, source port 408, or destination port 410. The source address 402 may indicate the address or addresses from which wakeup data 152 may be considered value. For example, the wakeup data 152 received from an IP address of 172.16.12.12 may be acceptable for waking up the application processor 106, while data received from 172.16.37.40 may not. Similarly, the destination address 404 may indicate a valid destination address associated with the wakeup. The protocol 406 may be used to specify a protocol such as TCP or UDP by which wakeups may be delivered. The source ports 408 and the destination ports 510 may also be defined.

Other data may be incorporated into the wakeup signature 136. A fragmentation offset 412 may be used to aid the wireless interface 122 in reconstructing packets. A size 414 may be indicated. For example, jumbo packets may be set to be invalid to wakeup.

The wakeup module 134 may be configured to process the payload 416 of the wakeup data 152. In some implementations the payload 416 may be used to designate a particular application to be called. When valid wakeup data 152 is received and the wakeup module 134 transitions the application processor 106 from the low power mode to the high power mode, the wakeup module 134 may further send the payload 416 or a portion thereof to the particular application.

The wakeup signature 136 may also include encryption 418 information. The wakeup data 152 may be encrypted in some implementations. The encryption 418 information may comprise information used to encrypt or decrypt the contents of the wakeup data 152.

The wakeup signature 136 may also comprise other data 420. For example, the wakeup module 134 may be configured to only accept wakeup data 152 which were originated at a particular time, or which show a particular packet routing.

Illustrative Process

Figure 5:
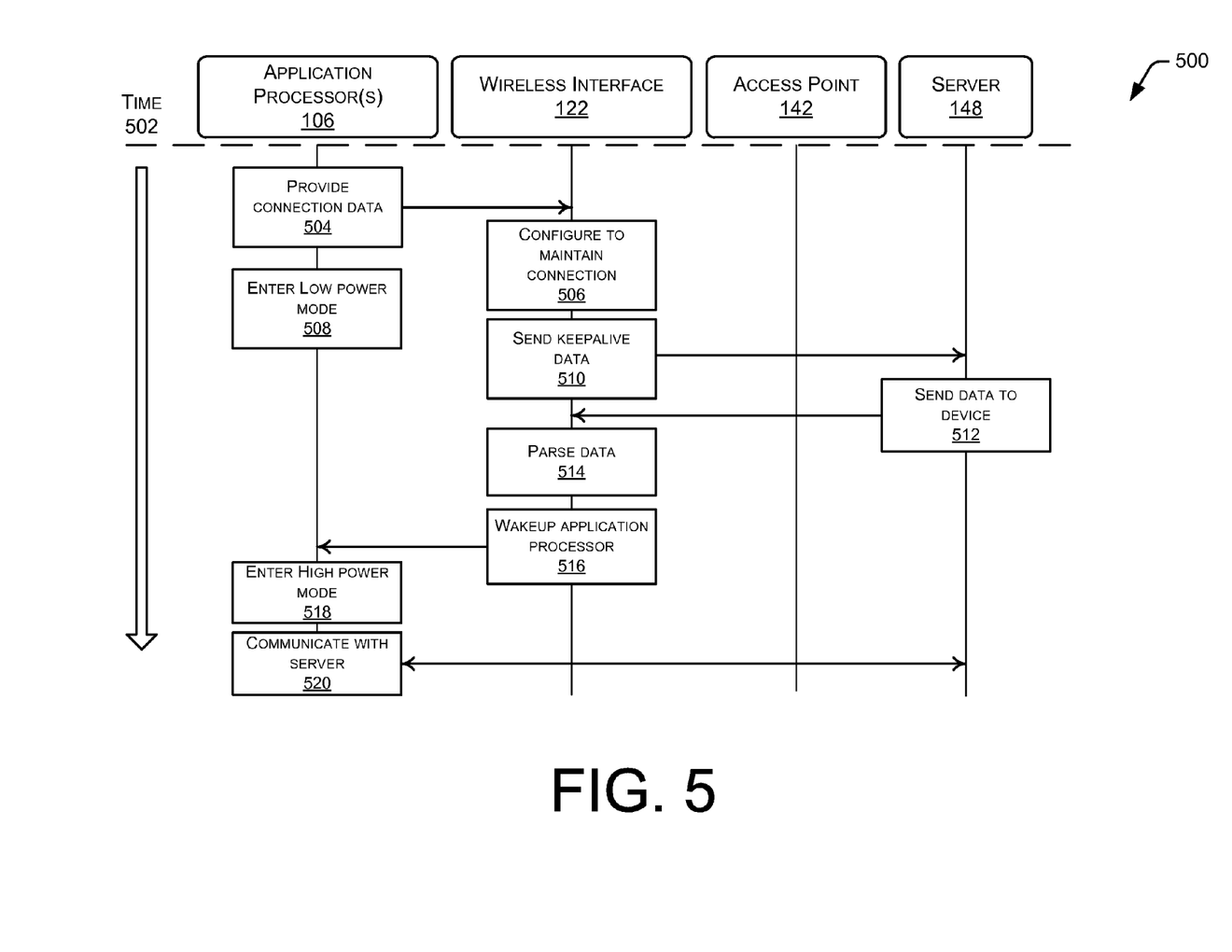
FIG. 5 illustrates interactions between several modules to respond to wakeup data while the application processor is in a low power mode.

FIG. 5 illustrates interactions 500 between several modules to respond to wakeup data while the application processor 106 is in the low power mode. In this diagram, time increases along the direction of arrow 502. Illustrated are the application processor 106, the wireless interface 122, the access point 142, and the server 148.

At 504 the communication module 118 executing on the application processor 106 provides connection data 130 to the wireless interface 122 describing an established wireless connection. At 506, the interface processor 124 processes at least a portion of the connection data 130 and configures the wireless interface 122 to maintain the connection. At 508, the application processor 106 transitions to the low power mode.

At 510, the wireless interface 122 sends keepalive data 150 to the server 148 via the wireless connection 140 with the access point 142. The wireless interface 122, configured with the connection data 130, may send the keepalive data 150 at the specified keepalive interval 204, thus maintaining the connection with the server 148.

At 512, the server 148 sends data to the wireless interface 122 of the user device 102. In some implementations this data may comprise the wakeup data 152. The interface processor 124 at 514 executes the wakeup module 134 to parse the received data, such as the wakeup data 152. The wakeup module 134 determines whether the data is valid and sufficient to trigger a wakeup of the application processor 106. In one implementations the wakeup module 134 may be configured to trigger a wakeup on any data received over the maintained connection with the server 148. In another implementation, the wakeup module 134 may be configured to trigger the wakeup of the application processor 106 upon receipt of the specific wakeup data 152 which corresponds to the wakeup signature 136.

At 516, the wakeup module 134 has determined a wakeup action is appropriate, such as when data has been received from the server 148 over the network connection, or when the wakeup data 152 is valid, and initiates a wakeup of the application processor 106 which results in a transition of the application processor 106 from the low power mode to the high power mode. As described above, in some implementations the wakeup may be initiated with an interrupt or other signal.

At 518, at least partly in response to the signal, the application processor 106 transitions to the high power mode. Once awake, at 520 the communication module 118, the other module 120, or both may communicate with the server 148 to exchange data 154.

Using the techniques described in this disclosure, the server 148 may continue to communicate with the user device 102, even when the application processor 106 is in a low power mode. This improves the user experience by allowing for receipt of data 154 while minimizing power consumption thus extending operating time while on battery power.

Figure 6:
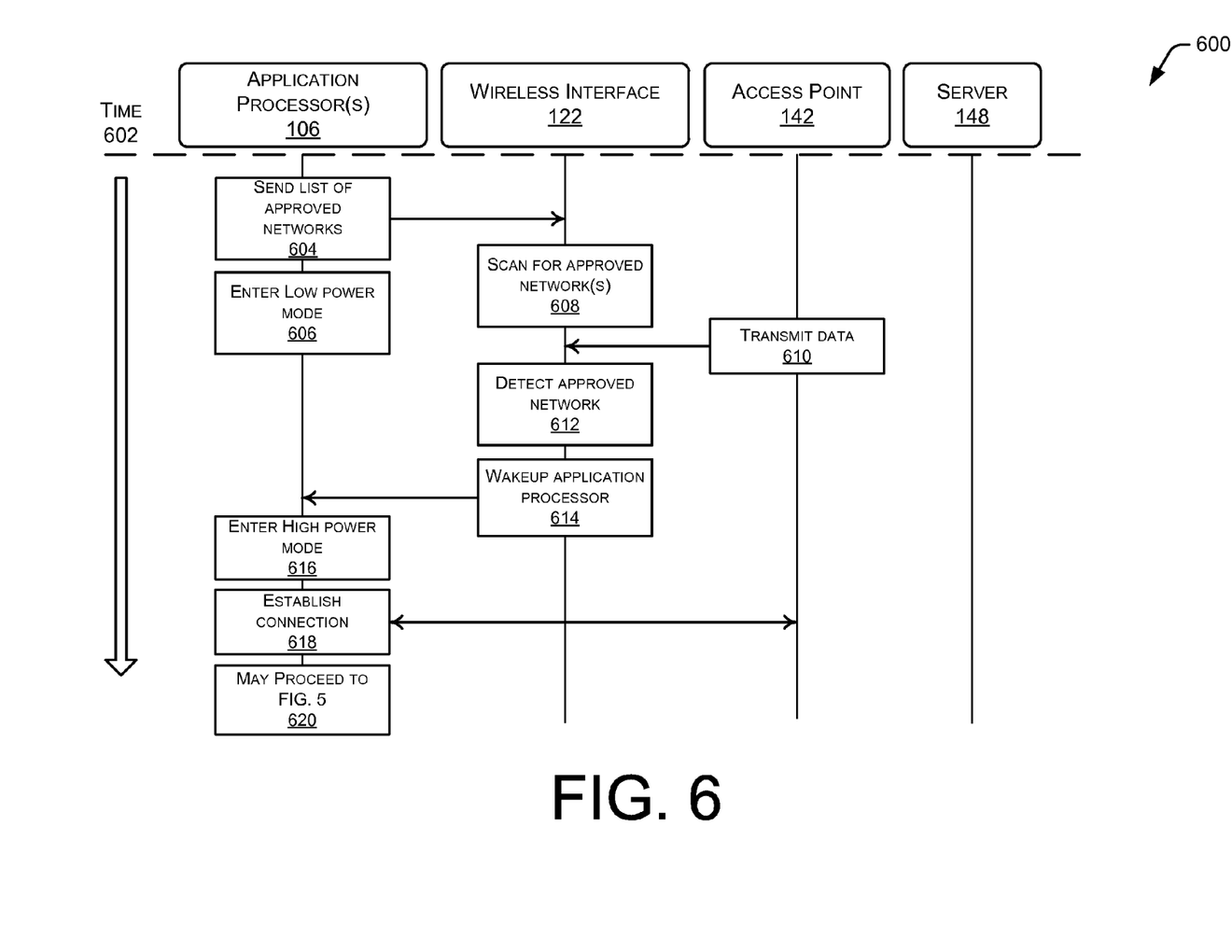
FIG. 6 illustrates interactions between several modules to scan for wireless networks while the application processor is in a low power mode.

FIG. 6 illustrates interactions 600 between several modules to scan for wireless networks while the application processor 106 is in the low power mode. As described above, in this diagram, time increases along the direction of arrow 602. Illustrated are the application processor 106, the wireless interface 122, the access point 142, and the server 148.

At 604 the communication module 118 executing on the application processor 106 provides the network list 132 to the wireless interface 122. As described above, the network list 132 comprises information about networks with which a network connection may be established.

At 608, the wireless interface 122 begins a scan for networks. This scan may be continuous or performed at intervals. At 606, the application processor 106 enters the low power mode. Meanwhile, the wireless interface 122 continues scanning for wireless networks.

At 610, the access point 142 or another device transmits data 610 which is received by the wireless interface 122 during the scan. For example, a service set identifier ("SSID") beacon may be received during the scan.

At 612, the received data is compared with the information on the network list 132. When a match is determined, at 614 the wireless interface 122 initiates a wakeup of the application processor 106 which results in a transition of the application processor 106 from the low power mode to the high power mode. As described above, in some implementations the wakeup may be initiated with an interrupt or other signal.

At 616, at least partly in response to the signal, the application processor 106 transitions to the high power mode. Once awake, at 618 the communication module 118, may establish a network connection using the detected approved network. In some implementations, at 620 once the network connection has been established the process may continue to that described above with regard to FIG. 5.

Figure 7:
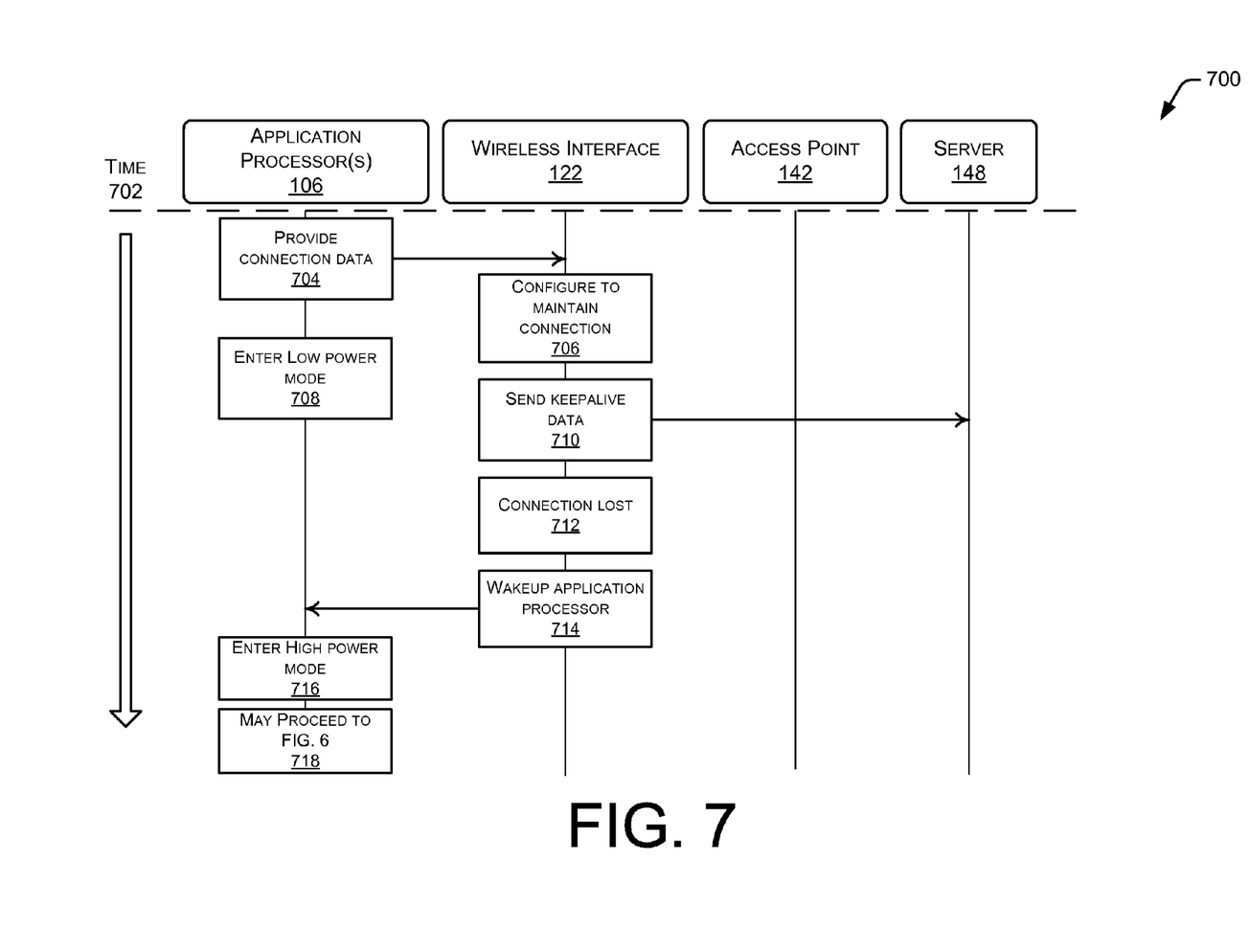
FIG. 7 illustrates interactions between several modules to transition the application processor from a low power mode to a high power mode when a connection is lost.

FIG. 7 illustrates interactions 700 between several modules to transition the application processor 106 from the low power mode to the high power mode when a connection is lost. The user device 102 may lose network connectivity due to changes in position, increased range, decreased power availability, changes at the access point 142, and so forth. The wireless interface 122 may be configured to wakeup the application processor 106 upon loss of connectivity. As above, in this diagram, time increases along the direction of arrow 702. Illustrated are the application processor 106, the wireless interface 122, the access point 142, and the server 148.

As described above with regard to FIG. 5, at 704 the communication module 118 executing on the application processor 106 provides connection data 130 to the wireless interface 122 describing an established wireless connection. At 706, the interface processor 124 processes at least a portion of the connection data 130 and configures the wireless interface 122 to maintain the connection. At 708, the application processor 106 transitions to the low power mode.

At 710, the wireless interface 122 sends keepalive data 150 to the server 148 via the wireless connection 140 with the access point 142. The wireless interface 122, configured with the connection data 130, may send the keepalive data 150 at the specified keepalive interval 204, thus maintaining the connection with the server 148.

At 712 the network connection is lost. For example, the server 148 may unavailable, the access point 142 may have failed, the network access privileges on the wireless network may have expired, and so forth.

At 714, the connection module 128 initiates a wakeup of the application processor 106 which results in a transition of the application processor 106 from the low power mode to the high power mode. As described above, in some implementations the wakeup may be initiated with an interrupt or other signal.

At 716, at least partly in response to the signal, the application processor 106 transitions to the high power mode. In some implementations, at 718 once the network connection has been established the process may continue to that described above with regard to FIG. 6.

Figure 8:
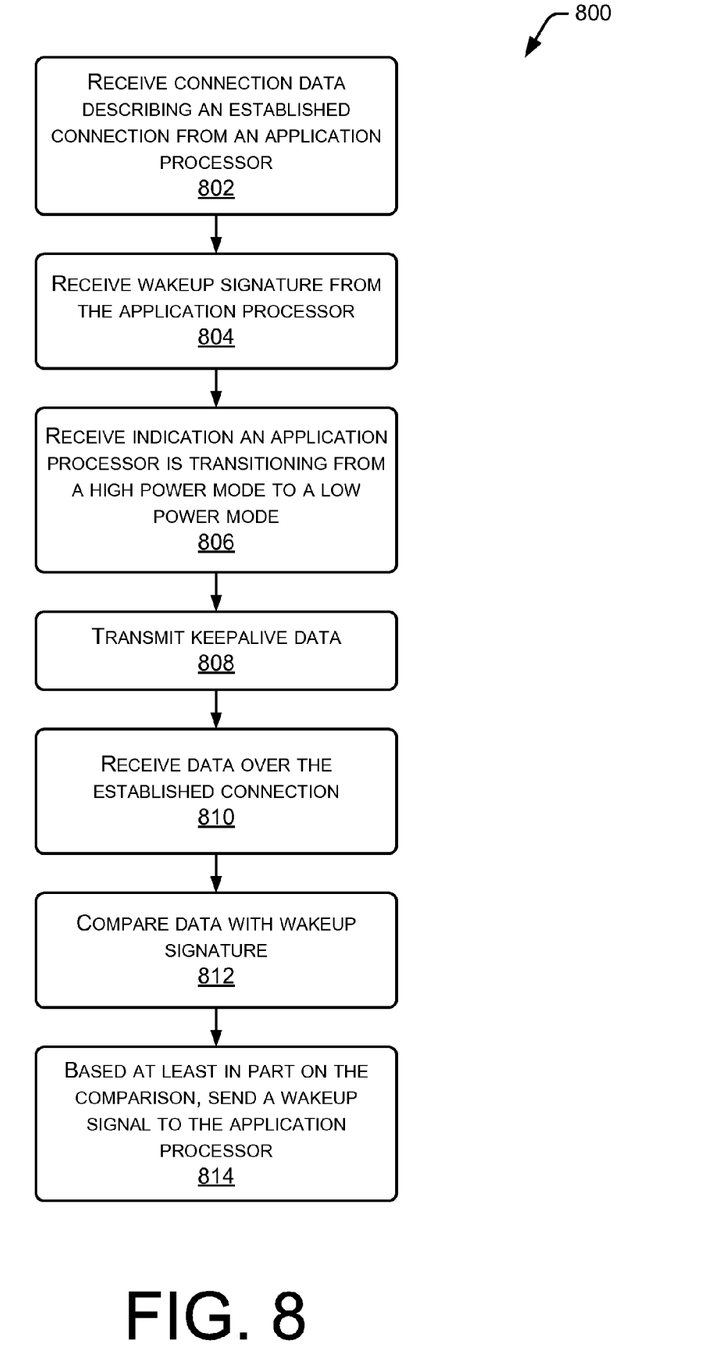
FIG. 8 is a flow diagram of a process of keeping a connection alive and responding to wakeup data.

FIG. 8 is a flow diagram 800 of a process of keeping a network connection alive and responding to wakeup data while the application processor 106 is in the low power mode. This process may be implemented by the connection module 128, the wakeup module 134, or a combination thereof which execute on the interface processor 124.

Block 802 receives the connection data 130. In some implementations this may use a communication interface between the memory 108 and the interface memory 126. As described above, the connection data 130 describes an established wireless networking connection using the transceiver 138. In some implementations, the transceiver 138 may be a radio frequency or radio transceiver.

Block 804 receives the wakeup signature 136. In some implementations this may use the communication interface between the memory 108 and the interface memory 126.

Block 806 may receive an indication the application processor 106 is transitioning from the high power mode to the low power mode. The wireless interface 122, based at least in part on the connection data 130 and the wakeup signature 136 continues to operate. In some implementations, the wireless interface 122 or portions thereof such as the interface processor 124 may transition between high power and low power modes to further reduce power consumption.

Block 808 transmits keepalive data 150. The keepalive data 150 may be transmitted at a pre-determined interval specified in the connection data 130, such as the keepalive interval 204. As described above, presence of the keepalive data 150 maintains a connection which is accessible to the server 148. By maintaining this connection, the server 148 is able to establish communication with the user device 102, even while the application processor 106 is in the low power mode.

Block 810 receives inbound data, such as wakeup data 152, over the established connection. For example, the server 148 may be attempting to communicate with the other module 120 on the user device 102.

Block 812 compares the inbound data with the wakeup signature 136. This comparison may include determining a match, mismatch, partial match, and so forth. Block 814, based at least in part on the comparison, sends a wakeup signal to the application processor 106. For example, in some implementations when the received data matches the wakeup signature 136 the device may the wakeup signal may be sent. As described above, this comparison may include determining a match, mismatch, partial match, and so forth. The wakeup signal may comprise a hardware or software interrupt configured to transition the application processor 106 from a low power state to a high power state. Once the application processor 106 is awake and in the high power state, at least a portion of the received data may be sent to the application processor 106 for processing.

Figure 9:
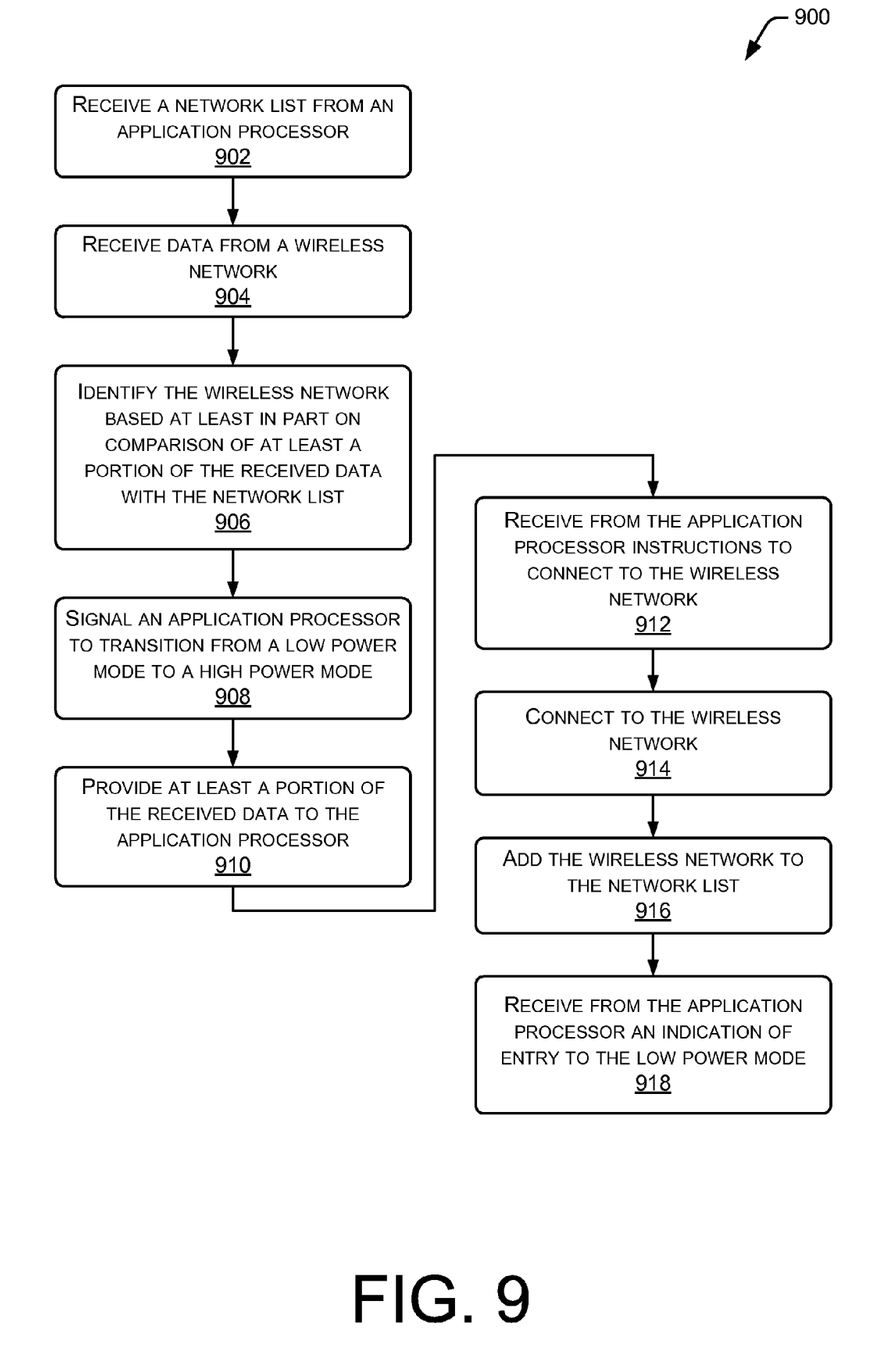
FIG. 9 is a flow diagram of a process of waking up the application processor when an unrecognized or approved network is discovered.

FIG. 9 is a flow diagram 900 of a process of waking up the application processor 106 when an approved network or unrecognized network is discovered. An unrecognized network is one which does not appear in the network list 132 or is otherwise known to the user device 102. This process may be implemented by the connection module 128 executing on the interface processor 124.

Block 902 receives the network list 132 from the application processor 106. As described above, the network list 132 describes wireless networks approved for connection and may include known but disapproved wireless networks.

Block 904 receives data from the wireless network. For example, a beacon may be received from the access point 142. Block 906 identifies the wireless network based at least in part on a comparison of at least a portion of the received data with the network list 134. For example, the wireless network may be identified as an unrecognized wireless network which does not appear in the approved networks 302 or the disapproved networks 304 of the network list 132.

Block 908 signals the application processor 106 to transition from the low power mode to the high power mode. This prepares the application processor 106 to execute the communication module 120 which is configured to determine what action to take with this unrecognized wireless network. Block 908 may signal the application processor 106 using a hardware interrupt sent along one or more general purpose input/output lines. In other implementations, a software interrupt sent along a data bus may be used.

Block 910 provides at least a portion of the received data to the application processor 106. The application processor 106 may execute a module such as the communication module 120 to process this data, and determine what action to take. These actions may include, but are not limited to, prompting the user to accept connection to this wireless network, validating credentials of the unrecognized network, disregarding the unrecognized network, and so forth.

Block 912 receives from the application processor 106 instructions to connect to the identified wireless network. For example, the instructions may configure the interface processor 124 to establish a network connection using the identified wireless network. Block 914 connects to the wireless network.

In some implementations, the connection module 128, the communication module 118, or both may be configured to add the wireless network to the network list 132 such as when not already present on the network list 132. As described above, the wireless interface 122 may be configured to maintain the network connection.

Block 918 receives from the application processor 106 an indication of entry to the low power mode. The wireless interface 122 now configured and connected with the wireless network maintains the connection while the application processor 106 is in the low power mode conserving power.

Figure 10:
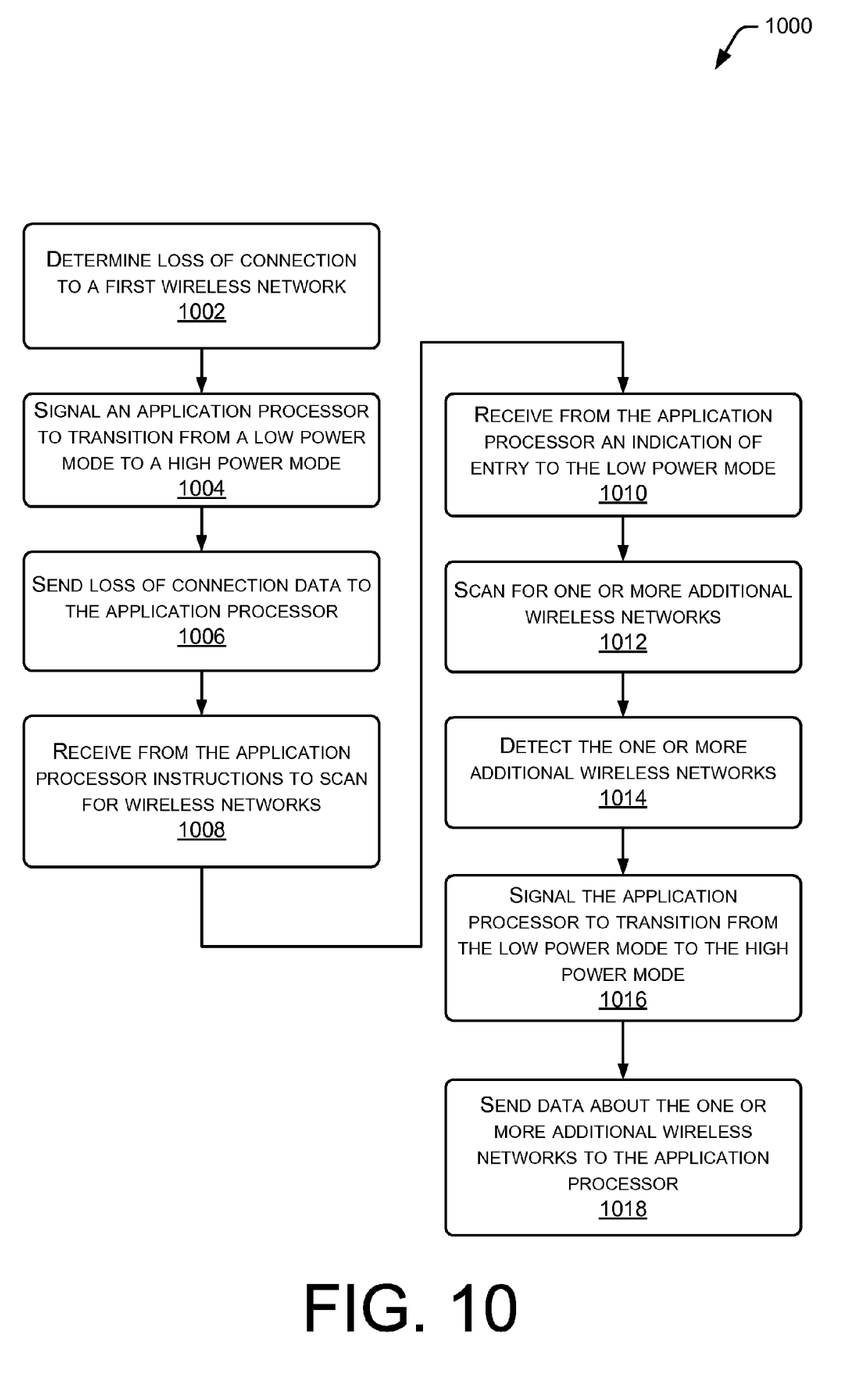
FIG. 10 is a flow diagram of a process of determining a loss of connectivity and scanning while an application process is in a low power state.

FIG. 10 is a flow diagram 1000 of a process of determining a loss of connectivity and scanning while an application process is in a low power state. This process may be implemented by the connection module 128 executing on the interface processor 124.

As above, the network connection may be lost for a variety of reasons. Block 1002 determines loss of connection to a first wireless network. For example, transmission of the keepalive data 150 may fail, or a pre-determined timeout interval may pass during which no beacon or other traffic associated with the wireless network is received by the wireless interface 122. The wireless network may comprise a wireless local area network ("WLAN"). In one implementation, the WLAN connection may be between the user device 102 and an access point for the network. In another implementation, the WLAN connection may be between the user device 102 and another user device 102 or other device.

Block 1004 signals the application processor to transition from the low power mode to the high power mode. Block 1006 sends to the application processor 106 data indicating the loss of connection to the first wireless network. The application processor 106 may execute the communication module 118 to process this data and select an action, if any.

Block 1008 receives from the application processor 106 instructions to scan for wireless networks. As the network connectivity has been lost, the communication module 118 may be configured to attempt to reestablish a network connection. Having handed the scanning task off to the wireless interface 122, block 1010 receives from the application processor 106 an indication of entry to the low power mode.

Block 1012 scans for one or more additional wireless networks. This scan may be continuous or take place at various intervals. Block 1014 detects the one or more additional wireless networks 1014. In some implementations, the scan results may be compared to the network list 132 as described above with regard to FIG. 8.

Block 1016 signals the application processor 106 to transition from the low power mode to the high power mode. Block 1018 sends data about the one or more additional wireless networks found during the scan to the application process 106. The communication module 118 may perform one or more actions based at least in part on the data. These actions may include connecting to one or more of the additional wireless networks found during the scan.

Figure 11:
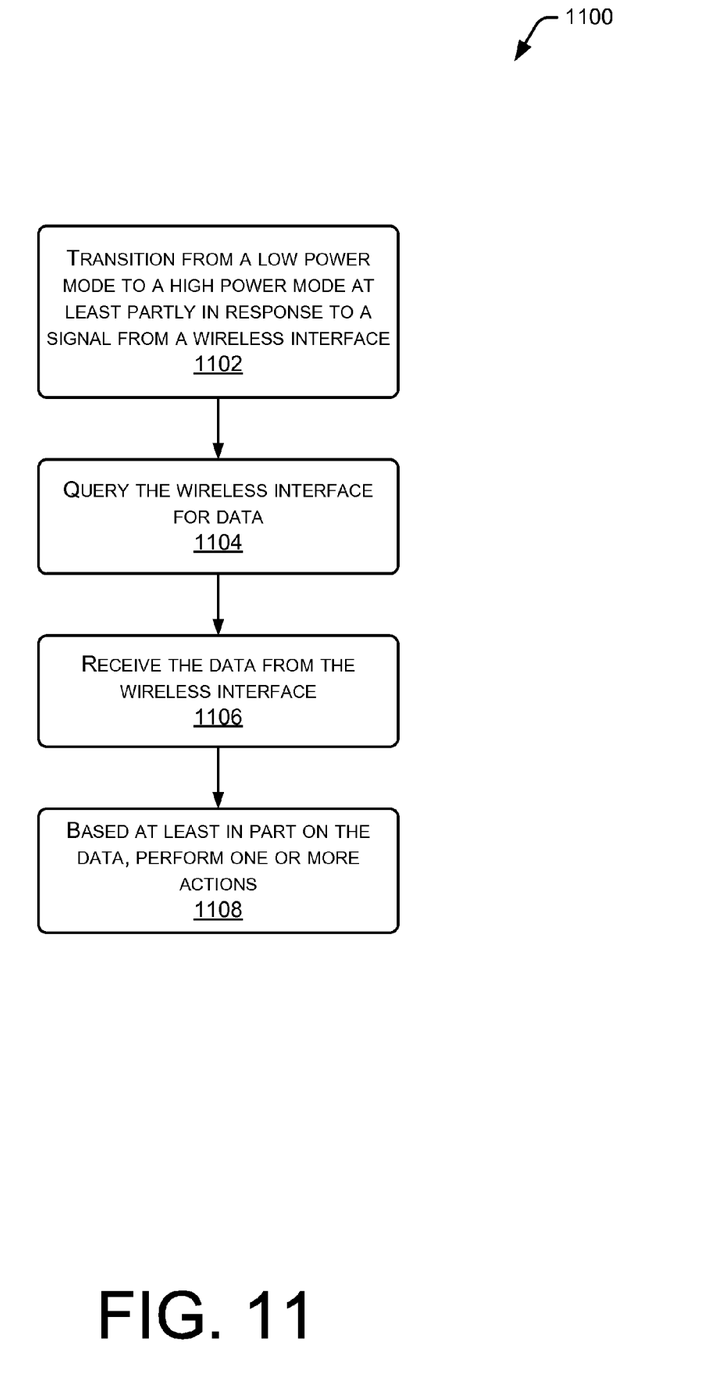
FIG. 11 is a flow diagram of a process of the application processor receiving a signal from the wireless interface.

FIG. 11 is a flow diagram 1100 of a process of the application processor receiving a signal from the wireless interface. This process may be implemented by the communication module 118 or other modules executing on the application processor 106.

Block 1102 transitions the at least one application processor 106 from the low power mode to the high power mode at least partly in response to a signal from the wireless interface 122.

Block 1104 queries the wireless interface 122 for data associated with one or more wireless local area network connections.

Block 1106 receives the data from the wireless interface 122. As described above, in one example the data may a portion of wakeup data 152 received by the wireless interface 122. In another example the data may comprise information indicative of a loss of connectivity for the one or more wireless local area network connections. In yet another example, the data may comprise detection of a wireless network. This may be a recognized wireless network such as appearing in the network list 132, or an unrecognized wireless network.

Block 1108, based at least in part on the data, performs one or more actions. The one or more actions may include configuring the wireless interface 122 to perform one or more functions and transitioning the application processor 106 from the high power mode to the low power mode. As described above, the one or more functions may include one or more of: periodically transmitting a user datagram protocol ("UDP") keepalive signal, receiving wakeup data corresponding to a pre-determined wakeup signature, or scanning for a pre-determined wireless local area network.

When wakeup data 152 is received, the one or more actions may comprise executing a particular application referenced by the data. For example, the wakeup data 152 may refer to an email application which would be executed and prepared to receive an incoming email.

When the data comprises loss of connection information, the one or more actions may comprise configuring the wireless interface 122 to scan for wireless local area networks. As described above, the scan may comprise transitioning the wireless interface 122 from a low power mode to a high power mode, receiving data from signals acquired by the wireless interface during a listening interval, and transitioning the wireless interface 122 from the high power mode to the low power mode. This may be done to minimize power consumption while extending scan time.

When the data comprises detection of a wireless network, the one or more actions may comprise establishing a connection with the detected wireless network. For example, when the scan detects the "Pine" network which is an approved network, the wireless interface 122 may be configured to establish a network connection and maintain that network connection.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated figures. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor of a user device, configure the at least one processor to perform operations comprising:
   causing to send, by the at least one processor, a list of approved networks to a wireless interface processor of the user device;
   causing to send instructions to the wireless interface processor to perform one or more functions comprising:
      periodically transmitting a user datagram protocol ("UDP") keepalive signal, detecting wakeup data corresponding to a pre-determined wakeup signature that includes encryption information used to encrypt or decrypt the contents of the wakeup data, and
      scanning for a wireless local area network;
   transitioning the at least one processor from the high power mode to the low power mode;
   receiving a wakeup signal from the wireless interface processor; identifying an indication of a connection to at least one approved network in the list of approved networks;
   transitioning the at least one processor from a low power mode to a high power mode based at least partly on the wakeup signal;

receiving data associated with the connection to the at least one approved network from the wireless interface processor; and based at least in part on the data, performing one or more actions.

2. The computer-readable media of claim 1, wherein the at least one processor comprises an application processor.

3. The computer-readable media of claim 1, the data comprising a portion of wakeup data received by the wireless interface processor and the one or more actions comprising executing on the at least one processor a particular application referenced by the data.

4. The computer-readable media of claim 1, wherein the data is indicative of a loss of connectivity by the wireless interface processor to the one or more wireless local area network connections; and the one or more actions comprising configuring the wireless interface processor to scan for wireless local area networks.

5. The computer-readable media of claim 4, wherein the configuring the wireless interface processor to scan for wireless local area networks comprises:

transitioning the wireless interface processor from a low power mode to a high power mode;

receiving data from signals acquired by the wireless interface processor during a listening interval; and transitioning the wireless interface processor from the high power mode to the low power mode.

6. The computer-readable media of claim 1, wherein the data is indicative of detection of a detected wireless network and the one or more actions comprise establishing a connection with the detected wireless network.

7. A computer-implemented method comprising:

causing to send, from a processor of a user device, a list of approved networks to a wireless interface processor of the user device;

causing to send instructions to the wireless interface processor to perform one or more functions comprising:

periodically transmitting a user datagram protocol ("UDP") keepalive signal, detecting wakeup data corresponding to a pre-determined wakeup signature that includes encryption information used to encrypt or decrypt the contents of the wakeup data, and scanning for a wireless local area network;

transitioning the at least one processor from the high power mode to the low power mode;

receiving a wakeup signal from the wireless interface processor;

identifying an indication of a connection to at least one approved network in the list of approved networks;

transitioning at least one processor of a user device from a low power mode to a high power mode based at least partly on the wakeup signal;

receiving data associated with the connection to the at least one approved network from the wireless interface processor; and based at least in part on the data, performing one or more actions.

8. The method of claim 7, wherein the at least one processor comprises an application processor.

9. The method of claim 7, the data comprising a portion of wakeup data received by the wireless interface processor and the one or more actions comprising executing on the at least one processor a particular application referenced by the data.

10. The method of claim 7, wherein the data is indicative of a loss of connectivity by the wireless interface processor to the one or more wireless local area network connections; and the one or more actions comprising configuring the wireless interface processor to scan for wireless local area networks.

11. The method of claim 10, wherein the configuring the wireless interface processor to scan for wireless local area networks comprises:

transitioning the wireless interface processor from a low power mode to a high power mode;

receiving data from signals acquired by the wireless interface processor during a listening interval; and transitioning the wireless interface processor from the high power mode to the low power mode.

12. The method of claim 7, wherein the data is indicative of detection of a detected wireless network and the one or more actions comprise establishing a connection with the detected wireless network.

* * * * *